March 10, 1970  W. K. HESSE ET AL  3,500,464
INSULATING ELECTRICAL HEATER SUPPORT
Filed Jan. 16, 1968
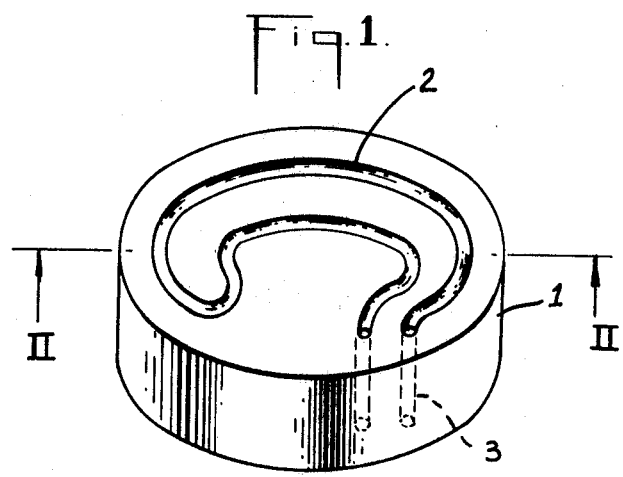
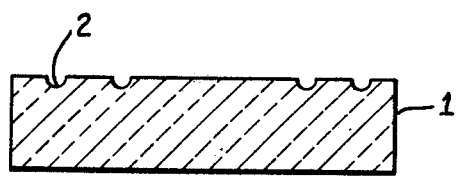
INVENTORS
WALTER K. HESSE
WILBUR C. BROWER
BY
ATTORNEY 3,500,464
INSULATING ELECTRICAL HEATER SUPPORT
Walter Kasper Hesse, Martinsville, and Wilbur Charles
Brower, Piscataway, N.J., assignors to Johns-Manville
Corporation, New York, N.Y., a corporation of New
York
Filed Jan. 16, 1968, Ser. No. 698,288
Int. Cl. H01c 1/02
U.S. Cl. 338—321                                                    7 Claims

ABSTRACT OF THE DISCLOSURE

An electrical and thermal insulating supporting base for electrical heating elements comprising a composite body of inorganic refractory fiber integrated into an intermeshed low density, uniform and continuous mass by filter molding, and of the ultimate product configuration.

BACKGROUND OF THE INVENTION

This invention relates to electrical heating devices, in particular electrical heating surface elements for domestic cooking stoves and similar kitchen appliances, but additionally has varied applications in electrical resistance and other types of electrical heating devices such as domestic or commercial electrical heaters, kilns or ovens, etc. Present electrical heating unit constructions typically comprise suspending the heating element, or supporting the element upon a dense refractory clay or mica base, which permit excessive heat energy losses through radiation in all directions into the ambient atmosphere and/or by conduction through the base which is normally a poor thermal insulating material due to its mass whereby significant amounts of heat energy are misguided and wasted and there results slow rates of heating as in cooking or heating and low efficiency or increased cost of operation.

SUMMARY OF THE INVENTION

In this invention the conjoint effects of the specific means of formation and components forming the product provide a supporting base for electrical heating elements of unique attributes for its intended service including enhanced performance of the electrical heating element mounted therein. This invention constitutes an economical and highly effective means of supporting and providing both electrical and thermal insulation of optimum effectiveness for electrical heating elements of various types which greatly increase their heating performance including raising the rate of heating capacity of an electric powered stove much closer to that of a gas fueled stove. The invention comprises a supporting base of an integral configuration to physically receive and accommodate the electrical heating element, which is of dielectric and density properties to effectively electrically and thermally insulate the electrical heating element in operation, and is composed of a mass of inorganic refractory fiber integrated into a composite body of low density and uniform continuous intermeshed consistency formed by filter molding the fibrous constitutents from a dilute liquid suspension.

It is the principal object of this invention to provide an improved and economical supporting base for electrical heating elements wherein the method of manufacturing is amenable to forming the supporting base to its precise ultimate dimensions and exact configuration including integral channels or protrusions to receive or embrace the heating element, and by virtue of its composition a product which constitutes an effective electrical and thermal insulation providing a safe dielectric support for the electrical heating element which efficiently inhibits wasteful dissipation of heat energy by concentrating and directing the generated heat energy to the intended object.

BRIEF DESCRIPTION OF THE DRAWING

This invention will be more fully understood and further objects and advantages thereof will become apparent when reference is made to the following detailed description of a preferred embodiment of the invention and the accompanying drawing in which:

FIG. 1 is a pictorial view illustrating a preferred and typical embodiment of a supporting base of this invention for an electrical heating element such as the common wire or ribbon coil resistance elements frequently employed in surface units for cooking stoves and hot plates, and;

FIG. 2 is a cross-sectional view of the preferred supporting base of FIG. 1 taken along line II—II which more clearly illustrates the serpentine channel in the surface of the supporting base of the invention.

DETAILED DESCRIPTION OF THE PREFERRED EMBODIMENT

The supporting base for electrical heating elements of this invention is principally composed of inorganic refractory fibers which have been integrated into a low density, substantially uniform and continuous intermeshed or felted mass by filter molding the components from a dilute liquid suspension. The filter molding process of formation, when utilized in combination with fine resilient fibers such as the type of fibers constituting the principal ingredient of this invention, dispersed in a dilute liquid suspension, will produce an interfelting or meshing of the fibers which is highly uniform and continuous thus minimizing electrically hazardous and thermally inefficient voids and deviations of consistency, and enables the controlling of the density of the resulting mass and permits formation of the exact desired product configuration including integrally formed heating element channels or protrusions whereby the consorted attributes of the forming process produce an overall superior supporting base.

The filter molding operation of this invention essentially consists of dispersing the constitutents of the supporting base product in water in proportions of about 0.1 to 10% by weight of solids, preferably about 1% by weight of solids, and forcing the liquid phase of the suspension through an appropriately configurated and dimensioned filter mold or screen provided with openings aptly sized to restrain passage of the fiber and any additional solids of the suspension whereby with continued filtering the fibers and any additional entrained solids are retained and collected uniformly intermeshed or felted with each other on the filtering surface of the screen mold and accumulated into a body having imparted therein the configuration of the filtering mold. The filtering procedure is simply continued for a period until the product is built to the desired depth. Suitable filter screen mold perforations for typical fibers of this invention can for example be provided with 5/16 of an inch holes positioned on 3/8 of an inch centers or by means of a comparably dimensioned wire mesh. A pressure differential on opposite sides of the screen mold provides the motivation for the filtering action of forcing the liquid component of the stock suspension through the screen and thereby effecting retention and accumulation of the solids component to form the product. An effective pressure differential can be provided through gravity, mechanical means such as a pump or piston, or comprise hydraulic or pneumatic means with either a super atmospheric pressure applied upstream of the filter screen or a subatmospheric pressure applied downstream thereof, or both, including either a closed pressure or open to the atmosphere system. The simple application of a vacuum to a mold unit in an open system is preferred because of the more economical equipment and operating conditions.

With this type of molding formation, channels or grooves, or protrusions, etc., in the surface of the molded body adaptable to receive electrical heating elements can, if expedient, be integrally introduced during formation, and without inducing density variation within the body of the product through the application of uneven compression, and obviating the need for subsequent cutting, routing, or other shaping operations which frequently tend to disrupt the continuity or uniformity of the product consistency.

A typical fibrous support base product for electrical heating elements designed for use with a common wire or ribbon coil resistance element, or other conventional electrical elements, in an electrical heating surface unit for domestic cooking stoves or hot plates is illustrated in FIGS. 1 and 2 of the drawing. The filter molded body of integrated inorganic refractory fiber is shown as 1, provided with an elongated channel 2 arranged in a typical serpentine configuration to accommodate a conventional wire coil resistance element. At each terminal of the channel the body 1 is provided with molded or drilled holes 3 communicating with the channel ends and passing back through the body of the supporting base to receive lead wires for the coil resistance element. The inclusion or location of passages for lead wires or connections are, of course, optional and should be designed to complement the particular unit construction. FIG. 2 comprises a cross-sectional view of FIG. 1 taken along lines II—II more clearly illustrating the channels provided in the surface of the body of the supporting base to accommodate an electrical heating element. The transverse configuration of the channel can be modified and should be of a complementary shape to receive and seat the contour of the given heating element.

The inorganic refractory fibrous material which constitutes the sole or the principal constituent of the supporting base of this invention comprise commercial materials which effectively resist thermal deterioration at the contemplated or designed temperature levels of use of the particular burner unit including a reasonable safety margin. Fibrous materials comprise semi-refractory wools or mineral fibers formed of relatively pure rock or argillaceous matter, or metallurgical slags providing thermal resistance at temperatures ranging up to about 1200 to 1500° F., depending upon composition purity. Preferred are compositions of higher refractoryness such as silica or quartz, magnesia, alumina-silica and including those alumina-silica fibers containing titania and/or zirconia in wide ranges of proportions, and assorted combinations of such manufactured inorganic fibers which exhibit resistance to thermal deterioration and temperatures up to approximately 2,000 to 2,500° F. Available commercial heat resistant synthetically produced inorganic refractory fibers are fully disclosed in an article entitled "Critical Evaluation of the Inorganic Fibers," Product Engineering, August 3, 1964, pages 96 to 100. The composition of fibers of the foregoing class is of anhydrous inorganic oxides of an amorphous or glassy consistency and as such are normally of dielectric electrical characteristics whereby they constitute an effective electrical insulation suitable for safe use with common electrical heating elements of a variety of domestic and commercial heating devices such as set forth hereinbefore.

To provide optimum strength characteristics it is preferred that the supporting base product of this invention comprising an integrated body of inorganic refractory fiber, additionally contains minor proportions of a binder to adhere the fibers to each other. Apt ratios of binder to refractory fiber comprise up to 35% by weight of binder with at least 60% by weight of refractory fiber and a typical optimum ratio consists of about 10 to 25% by weight of binder to about 90 to 75% by weight of fiber. Effective high temperature binders include for example, clays such as bentonite and hectorite, alkali metal silicates such as sodium and potassium silicates, frit, borax, aluminum phosphate, colloidal silica, colloidal alumina, etc. and combinations thereof in finely divided particulate or solution form.

Optional ingredients comprise organic or fugitive binders such as starch or organic resins which contribute to green or predried strength but burn out upon exposure to elevated temperatures. Also, organic fibers such as cellulosic news or kraft pulp are effective in increasing green or predried strength and which similarly burn out upon exposure to high temperatures. These organic or fugitive binders or fibers can be included in minor amounts to assist in manufacturing and handling in proportions of up to about 15% by weight.

To provide maximum thermal insulating efficiency commensurate with strength requirements, the supporting base of a body of integrated inorganic refractory fibers should be of a density of between about 6 to 30 pounds per cubic foot with approximately 10 to 15 pounds per cubic foot being most suitable for typical applications. Product density can be controlled within reasonable limits with fibrous components of the type suitable for this invention primarily by means of the degree of pressure differential applied, although the stock composition will have some effect thereon.

A typical product of this invention is produced from a dilute water suspension of an exemplary formulation, dispersed in 100 gallons of water, consisting, in percent by weight, of 12% (0.42 lb.) Baymal solids, duPont's colloidal alumina product described in U.S. Patent No. 2,915,475 and the literature; 4% (0.14 lb.) papermakers alum (aluminum sulfate) coagulant; and, 84% (2.94 lbs.) inorganic refractory fiber of substantially equal parts alumina and silica (Johns-Manville Corp.'s Cerafiber). The Baymal constitutes the binder component and the papermakers alum serves to fluocculate the colloidal size particles of the Baymal and aid in its retention upon the fibers during filtering.

Formation of the product is accomplished by submerging a suitably configured mold screen body into the suspension and applying thereto a sub-atmosphere of about 20 inches of mercury through an attached vacuum system. Under these conditions a 5 inch diameter supporting base, with integral channels, is molded to a thickness of approximately 1 inch and density of about 12 p.c.f. in approximately 25 seconds.

Alternatively the supporting base can be formed under like filter molding conditions from a water suspension of only the fiber, and thereafter treated with a binder if desired.

Surface portions, or the entire suporting base of the body of integrated inorganic refractory fiber can be treated or impregnated with indurating agents to harden its composition and increase its strength and resistance to abuse. Suitable indurating agents comprise colloidal silica, sodium and/or potassium silicate, aluminum phosphates, etc.

It will be understood that the foregoing details are given for purposes of illustration, not restriction, and that the variations within the spirit of this invention are intended to be included within the scope of the appended claims.

What we claim is:

1. A supporting base for an electrical heating element having electrical and thermal insulating properties, comprising a low density integrated body of uniformly and continuously intermeshed fine resilient inorganic refractory fiber having within at least one surface a channel of dimensions adaptable to receive an electrical heating element, said low density electrical and thermal insulating body being the product of integrating the fine resilient inorganic refractory fiber into a composite continuous interfelted mass with the channel formed within its surface by filter molding the fine resilient fibrous component from a dilute liquid suspension thereof and thus accumulating said fine resilient fibers into a relatively uniform and continuous intermeshed mass thereby exhibiting optimum strength and electrical and thermal insulating properties.

2. The supporting base product of claim 1 wherein the channel formed within its surface is an elongated channel of a serpentine pattern.

3. The supporting base product of claim 1 wherein the integrated body of inorganic refractory fiber comprises up to about 35% by weight of the product of an inorganic binder.

4. The supporting base product of claim 3 wherein the integrated body of inorganic refractory fiber is of a density of approximately 6 to approximately 30 pounds per cubic foot.

5. The supporting base product of claim 4 wherein the integrated body of inorganic refractory fiber is of a density of approximately 10 to approximately 15 pounds per cubic foot.

6. The supporting base product of claim 4 wherein at least the surface of the integrated body of inorganic refractory fiber with the channel formed therein is impregnated with an indurating agent to harden the same.

7. The supporting base product of claim 4 wherein the inorganic refractory fiber of the integrated body is substantially of a composition comprising alumina and silica.

References Cited

UNITED STATES PATENTS

| | | | |
|---|---|---|---|
| 1,265,433 | 5/1918 | Davenport | 338—321 |
| 1,431,407 | 10/1922 | McClatchie | 338—285 X |
| 2,546,230 | 3/1951 | Modigliani. | |
| 2,620,513 | 12/1952 | Cryor. | |
| 3,017,318 | 1/1962 | Labino | 161—170 |

E. A. GOLDBERG, Primary Examiner

U.S. Cl. X.R.

161—170, 193; 338—285, 310, 311